US010589977B2

(12) United States Patent
Yu

(10) Patent No.: US 10,589,977 B2
(45) Date of Patent: Mar. 17, 2020

(54) DRINKING WATER SUPPLY DEVICE AND METHOD OF CONTROLLING THE SAME

(71) Applicant: LG ELECTRONICS INC., Seoul (KR)

(72) Inventor: Kiwon Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 15/749,556

(22) PCT Filed: Jul. 19, 2016

(86) PCT No.: PCT/KR2016/007839
§ 371 (c)(1),
(2) Date: Feb. 1, 2018

(87) PCT Pub. No.: WO2017/022979
PCT Pub. Date: Feb. 9, 2017

(65) Prior Publication Data
US 2018/0229991 A1   Aug. 16, 2018

(30) Foreign Application Priority Data
Aug. 3, 2015   (KR) .................. 10-2015-0109631

(51) Int. Cl.
*B01D 1/00*   (2006.01)
*B01D 1/08*   (2006.01)
(Continued)

(52) U.S. Cl.
CPC ......... *B67D 1/0014* (2013.01); *B67D 1/0864* (2013.01); *B67D 1/0888* (2013.01);
(Continued)

(58) Field of Classification Search
CPC .. B67D 1/0014; B67D 1/0888; B67D 1/0864; B67D 1/0895; B67D 2210/0001;
(Continued)

(56) References Cited

U.S. PATENT DOCUMENTS 3,375,913 A * 4/1968 Norris, Jr. ............... G07F 13/00
194/240
3,476,247 A * 11/1969 Rose ........................ B01J 49/75
210/95

(Continued)

FOREIGN PATENT DOCUMENTS

JP     2000-357269     12/2000
KR   10-2010-0076350    7/2010
(Continued)

OTHER PUBLICATIONS

International Search Report (with English Translation) and Written Opinion dated Nov. 2, 2016 issued in Application No. PCT/KR2016/007839.

*Primary Examiner* — Joseph W Drodge
(74) *Attorney, Agent, or Firm* — Ked & Associates, LLP

(57) ABSTRACT

A method of controlling a drinking water includes allowing a user to input a water discharge signal through an input lever, opening a first valve when a channel is closed by a water discharge valve to supply drinking water to a mixing tank, when the amount of drinking water supplied to the mixing tank reaches a first predetermined amount, opening a second valve to supply minerals to the mixing tank, and, when the amount of drinking water supplied to the mixing tank reaches a second predetermined amount, opening the water discharge valve to discharge mineral water to the outside through a spout.

13 Claims, 3 Drawing Sheets

(51) Int. Cl.
   *B01D 35/15*   (2006.01)
   *B67D 1/08*   (2006.01)
   *C02F 1/68*   (2006.01)
   *B67D 1/00*   (2006.01)
   *B01D 35/157*   (2006.01)

(52) U.S. Cl.
   CPC .............. *C02F 1/687* (2013.01); *C02F 1/688* (2013.01); *B01D 35/1573* (2013.01); *B67D 1/0895* (2013.01); *B67D 2210/0001* (2013.01)

(58) Field of Classification Search
   CPC .. B67D 1/0042; B67D 1/0051; B67D 1/0052; B67D 2001/0093; B67D 2001/0094; B67D 2210/00005; B67D 2210/00047; B67D 2210/00049; C02F 1/688; C02F 1/687; C02F 1/003; C02F 1/008; C02F 1/68; C02F 1/685; C02F 2201/005; C02F 2209/40; C02F 2209/42; B01D 35/1573; B01D 35/02; B01D 35/157; B01D 36/00; B01D 2201/0001; B01D 2201/02; B01D 2201/16; B01D 2201/165; B01D 2210/0001; B01F 3/20; B01F 3/2014; B01F 3/2078; B01F 3/2057; B01F 15/00136; B01F 15/00149; B01F 15/00155; B01F 15/0201; B01F 15/0202; B01F 15/0213; B01F 15/0216; B01F 15/026; B01F 15/0441
   USPC .......... 222/1, 14, 22, 40, 52, 56, 57, 59, 64, 222/639, 71, 129, 129.1, 135, 145.5, 222/145.6, 186.06, 186.08, 189.11, 544, 222/545; 210/101, 109, 110, 134, 138, 210/143, 257.1, 257.2, 258, 259
   See application file for complete search history.

(56) References Cited

U.S. PATENT DOCUMENTS

| | | | | |
|---|---|---|---|---|
| 3,785,492 | A * | 1/1974 | Mazza | B67D 1/0406 210/149 |
| 5,443,739 | A * | 8/1995 | Vogel | B01D 61/08 210/652 |
| 6,358,395 | B1 | 3/2002 | Schorzman et al. | |
| 6,669,053 | B1 * | 12/2003 | Garson | B67D 1/0036 222/129.1 |
| 10,031,533 | B2 * | 7/2018 | Jeong | G05D 16/2066 |
| 10,077,544 | B2 * | 9/2018 | Lee | G05D 11/001 |
| 10,266,437 | B2 * | 4/2019 | Yoon | C02F 1/686 |
| 10,399,874 | B2 * | 9/2019 | Lee | C02F 1/008 |
| 2003/0234212 | A1 * | 12/2003 | Ito | C02F 1/46114 210/85 |
| 2005/0006289 | A1 * | 1/2005 | Biesheuvel | C02F 1/68 210/194 |
| 2005/0133427 | A1 * | 6/2005 | Rinker | C02F 1/003 210/209 |
| 2006/0191785 | A1 * | 8/2006 | Ito | C02F 1/461 204/228.6 |
| 2014/0158638 | A1 * | 6/2014 | Caulkins | C02F 1/68 210/750 |

FOREIGN PATENT DOCUMENTS

| | | |
|---|---|---|
| KR | 10-2013-0062010 | 6/2013 |
| KR | 10-1441240 | 9/2014 |
| WO | WO 03-072510 | 9/2003 |

\* cited by examiner

[Fig. 1]
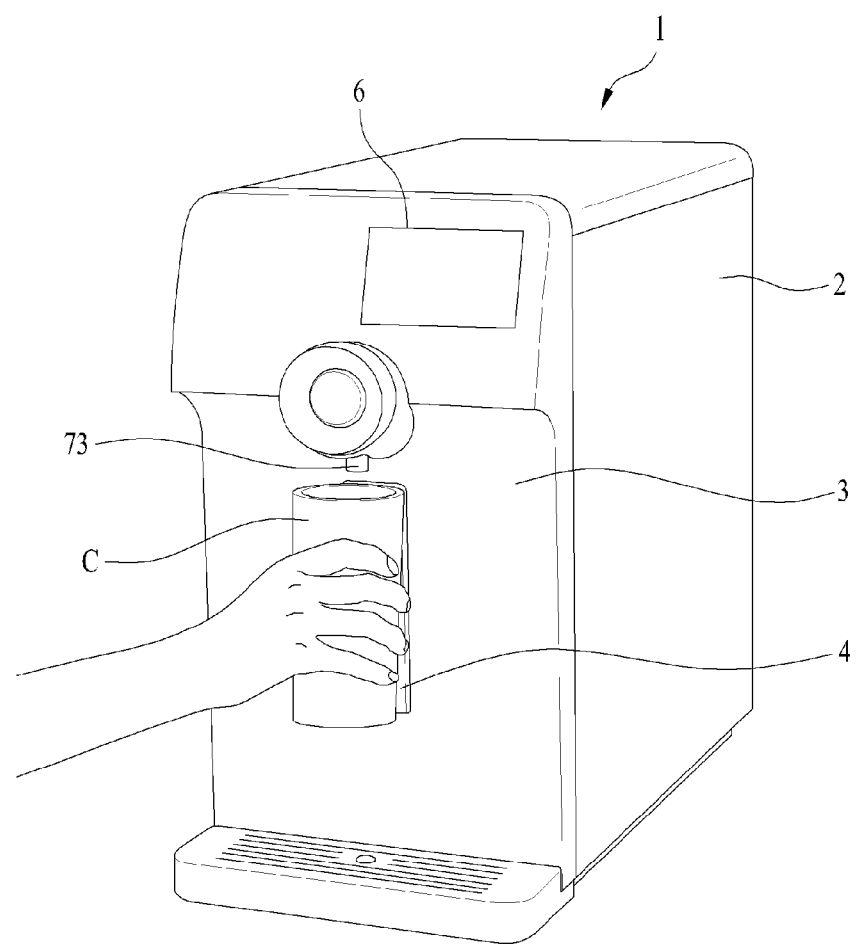

[Fig. 2]
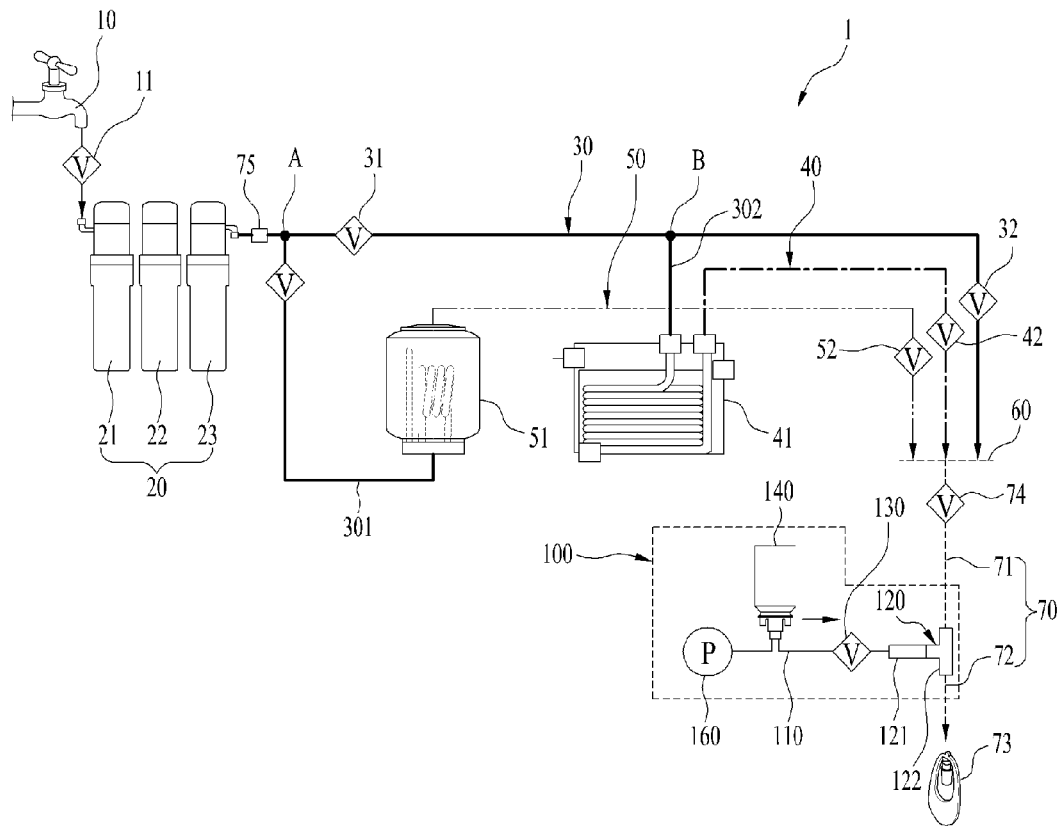
[Fig. 3]
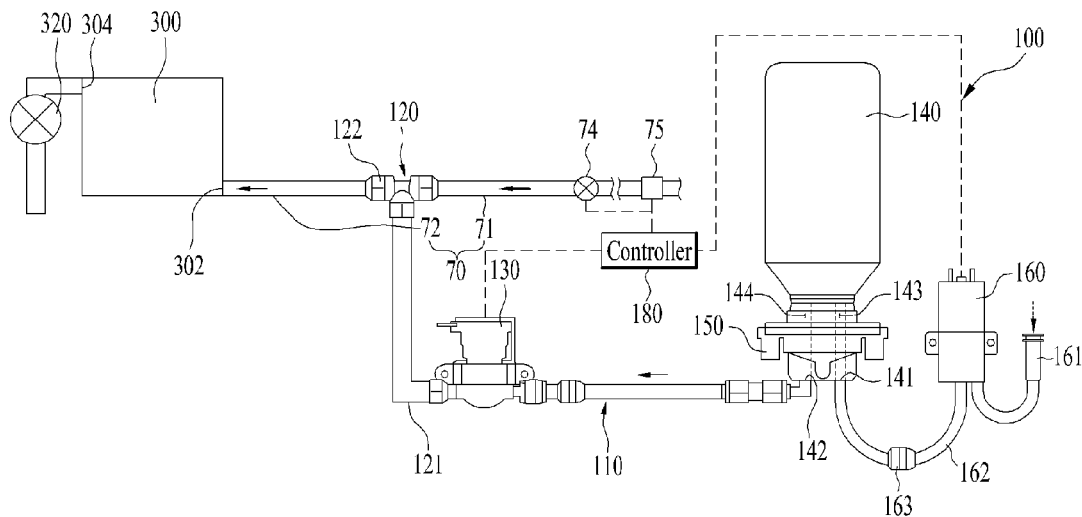

[Fig. 4]
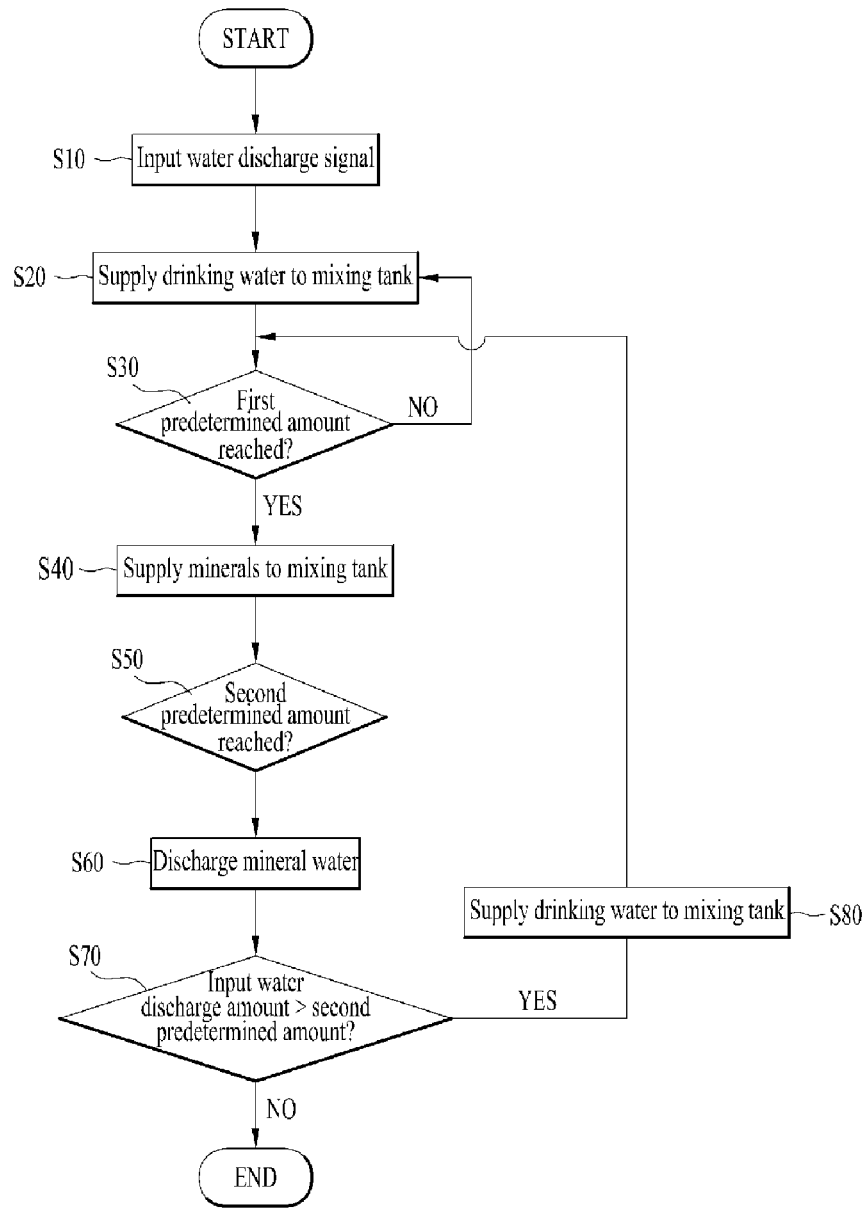

DRINKING WATER SUPPLY DEVICE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2016/007839, filed Jul. 19, 2016, which claims priority to Korean Patent Application No. 10-2015-0109631, filed Aug. 3, 2015, whose entire disclosures are hereby incorporated by reference.

TECHNICAL FIELD

The present invention relates to a drinking water supply device that is capable of supplying mineral water and a method of controlling the same, and more particularly to a drinking water supply device that is capable of stably mixing mineral with drinking water to provide water having a uniform taste and a method of controlling the same.

BACKGROUND ART

In general, a drinking water supply device is a device that supplies drinking water to a user. The drinking water supply device may be a stand-alone device, or may constitute part of an electric home appliance, such as a refrigerator.

The drinking water supply device may supply drinking water at room temperature to a user. In addition, the drinking water supply device may cool drinking water flowing therein using a cold water supply unit including a refrigeration cycle, or may heat the drinking water using a heater. That is, the drinking water supply device may supply cold water or hot water to the user as needed.

Drinking water may be underground water, raw water supplied from a faucet, or clean water obtained by filtering raw water supplied from the faucet using an additional filtering means, such as a filter. In the following description, however, drinking water will be defined as drinkable water. That is, drinking water is not limited to the above-mentioned kinds of water.

In recent years, there have been developed drinking water supply devices that are capable of providing functional water satisfying various demands of users in addition to the provision of filtered clean water, cold water, or hot water to users. For example, the drinking water supply device may include a mineral supply module in order to provide mineral water, which contains a predetermined amount of minerals, to a user.

Together with protein, fat, carbohydrates, and vitamins, minerals constitute the five types of nutritional substances. Minerals are known to play an important part in biochemical activity (e.g. catalytic activity) in the human body and in the constitution of the bones, teeth, etc.

In particular, calcium (Ca), potassium (K), magnesium (Mg), and sodium (Na) are mineral elements requisite for metabolism although it is sufficient to supply a very small amount of these mineral elements to the human body Mineral water, which contains such minerals, may play a supporting role in improving a user's health, such as discharging waste matter from the human body and promoting digestion.

In the case in which a predetermined amount of minerals are contained in drinking water, the water may taste better to a user than when the user drinks drinking water. In order to generate such mineral water, mineral supply modules, such as an electro-analyzer, a mineral filter, and a device for directly supplying condensed minerals to clean water, may be installed in the drinking water supply device.

In order to directly supply condensed minerals to clean water, it is necessary to provide a mineral container for storing condensed minerals and a mineral supply line connected between the mineral container and a drinking water supply line for adding the condensed minerals to drinking water. Meanwhile, the drinking water supply device may have a quantitative control mode, in which a predetermined amount of drinking water is supplied to a user, and a real time control mode, in which a desired amount of drinking water is supplied to the user in real time.

That is, in the quantitative control mode, the user may input a command through a quantitative control input unit provided in the drinking water supply device such that the drinking water supply device supplies a predetermined amount of drinking water to the user. On the other hand, in the real time control mode, the user may manipulate a drinking water discharge button or lever provided in the drinking water supply device, instead of inputting a command through the quantitative control input unit, such that the drinking water supply device supplies a desired amount of drinking water to the user in real time. In the real time control mode, however, it is not possible to determine how much water the user will discharge, with the result that it is difficult to determine when and how much minerals will be provided to water that the user will discharge.

DISCLOSURE

Technical Problem

An object of the present invention devised to solve the problem lies on a drinking water supply device that is capable of supplying mineral water containing a uniform ratio of minerals even when a user discharges water in a real time control mode and a method of controlling the same.

Technical Solution

The object of the present invention can be achieved by providing a drinking water supply device including a first channel for guiding drinking water, the first channel being provided with a first valve for opening and closing the first channel and a flow rate sensor for sensing the flow rate of the drinking water, a water discharge channel connected to the rear end of the first channel for discharging the drinking water, a connection pipe connected between the first channel and the water discharge channel, a second channel for supplying minerals to the connection pipe, the second channel being provided with a second valve for opening and closing the second channel, a mineral container connected to the connection pipe via the second channel and disposed at the front end of the second vale for receiving condensed minerals, a mixing tank connected to the rear end of the water discharge channel for mixing minerals with drinking water before mineral water is supplied to a user, a water discharge valve disposed at the rear end of the mixing tank for opening and closing the water discharge channel, an input unit for allowing the user to input the amount of mineral water to be discharged, and a controller for, upon receiving a water discharge signal from the input unit, opening the first valve and the second valve first and then opening the water discharge valve.

The controller may control the water discharge valve to close the water discharge channel until a first predetermined amount of drinking water is supplied to the mixing tank as the result of opening the first valve. When the first predetermined amount of drinking water is supplied to the mixing tank, the controller may open the first valve and the second valve while keeping the water discharge valve closed so as to supply minerals to the mixing tank.

When a second predetermined amount of drinking water is supplied to the mixing tank, the controller may open the water discharge valve to supply mineral water to the user. The mixing tank may be provided with a water inlet port, disposed in the lower part thereof, and a water outlet port, disposed in the upper part thereof, the water inlet port being located lower than the water output port.

When a water discharge amount input by the user has not been reached in the state in which the second predetermined amount of drinking water is supplied to the mixing tank, the controller may keep the water discharge valve open. The second predetermined amount may be equal to the capacity of the mixing tank.

When the water discharge amount input by the user has not been reached in the state in which the second predetermined amount of drinking water is supplied to the mixing tank, the controller may keep the first valve open. When the time when the second predetermined amount of drinking water is supplied to the mixing tank again has been reached in the state in which the first valve is open, the controller may open the second valve again to supply minerals to the mixing tank.

In another aspect of the present invention, provided herein is a method including allowing a user to input a water discharge signal through an input unit, opening a first valve in the state in which a channel is closed by a water discharge valve to supply drinking water to a mixing tank, when the amount of drinking water supplied to the mixing tank reaches a first predetermined amount, opening a second valve to supply minerals to the mixing tank, and, when the amount of drinking water supplied to the mixing tank reaches a second predetermined amount, opening the water discharge valve to discharge mineral water to the outside through a cock.

The method may further include, when the user inputs a signal for discharging a greater amount of mineral water than the second predetermined amount through the input unit, keeping the first valve open in the state in which the water discharge valve is open. The method may further include, when the user inputs a signal for discharging a greater amount of mineral water than the second predetermined amount through the input unit, opening the second valve whenever the first predetermined amount of drinking water is supplied to the mixing tank in the state in which the water discharge valve and the first valve are open. The second predetermined amount may be equal to the capacity of the mixing tank.

The mixing tank may be provided with a water inlet port, disposed in the lower part thereof for allowing minerals and drinking water to be introduced therethrough, and a water outlet port, disposed in the upper part thereof for allowing mineral water to be discharged therethrough. The method may further include, when the amount of mineral water input by the user is discharged, closing the first valve, the second valve, and the water discharge valve.

Advantageous Effects

According to the present invention, water may contain a uniform concentration of minerals even when a user continuously discharges the water, whereby the user may drink water having a uniform taste. In addition, minerals are mixed with drinking water in a mixing tank before water is supplied into a user's cup, whereby the water may taste uniformly even when the user immediately drinks the water in the cup. In addition, even when the user wishes to discharge a greater amount of mineral water than the capacity of the mixing tank, minerals are mixed with drinking water in the mixing tank simultaneously when water is discharged through a cock, whereby water having a uniform taste may be supplied to the user.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a perspective view showing the external appearance of a drinking water supply device according to an embodiment of the present invention;

FIG. 2 is a conceptual view showing the structure and pipe arrangement of the drinking water supply device according to the embodiment of the present invention;

FIG. 3 is a view schematically showing the construction of a mineral supply module according to an embodiment of the present invention; and FIG. 4 is a flowchart showing a method of controlling a drinking water supply device according to an embodiment of the present invention.

BEST MODE

Reference will now be made in detail to the preferred embodiments of the present invention, examples of which are illustrated in the accompanying drawings. Wherever possible, the same reference numbers will be used throughout the drawings to refer to the same or like parts. In the drawings, sizes and shapes of elements may be exaggerated or reduced for convenience and clarity of description.

In the following description, water that has yet to pass through a filter will be defined as raw water, raw water that has passed through a filter will be defined as clean water, and raw water or clean water containing minerals will be defined as mineral water. In addition, raw water and clean water may be defined as drinking water, which means water that a user may drink.

In addition, the front end and the rear end may mean the upstream side and the downstream side in the direction in which a fluid flows forward. The forward flowing direction is the direction in which drinking water flows in a drinking water supply device before the drinking water is discharged out of the drinking water supply device.

FIG. 1 is a perspective view showing the external appearance of a drinking water supply device according to an embodiment of the present invention. Referring to FIG. 1, a drinking water supply device 1 includes a cabinet 2, which forms the external appearance of the drinking water supply device 1, and a dispenser 3. The dispenser 3 is a space in which drinking water is supplied to a user. Consequently, the dispenser 3 is generally formed on the front of the cabinet 2.

The dispenser 3 may be provided with a cock (or spout) 73, through which drinking water is discharged. In addition, the dispenser 3 may also be provided with an input unit (or input lever) 4 for controlling the discharge of drinking water. The input unit 4 may be formed in the shape of a lever, which is pushed or pulled by the user.

The user may push or pull the input unit 4, which is formed in the shape of a lever. For example, the user may push or pull the lever, in the state in which the user has placed a cup C under the cock 73, to fill the cup C with drinking water discharged through the cock 73.

At this time, the drinking water supply device 1 may be operated in a real time control mode. In the real time control mode, the drinking water supply device 1 may be controlled to discharge drinking water through the cock 73 based on a time during which the user pushes or pulls the lever. That is, when the user manipulates the lever, the drinking water supply device 1 may be operated in the real time control mode.

Meanwhile, the drinking water supply device 1 may further include a mineral supply module (see FIGS. 2 and 3) for supplying minerals to drinking water that will be discharged from the drinking water supply device 1. That is, the drinking water supply device 1 may supply drinking water containing minerals, i.e. mineral water, to the user through the mineral supply module.

The drinking water supply device 1 may be further provided with a display unit (or display) 6 for showing a time when a mineral container provided in the mineral supply module is to be replaced or the like. Meanwhile, in the embodiment shown in FIG. 1, the drinking water supply device 1 is a stand-alone device. Alternatively, the drinking water supply device 1 may constitute part of another device, such as a refrigerator.

Hereinafter, the structure and pipe arrangement of the drinking water supply device, which is provided with a mineral supply module according to an embodiment of the present invention, will be described with reference to FIG. 2. FIG. 2 is a conceptual view showing the structure and pipe arrangement of the drinking water supply device according to the embodiment of the present invention.

Referring to FIG. 2, the drinking water supply device 1 according to the embodiment of the present invention may convert raw water, introduced into the drinking water supply device 1 through an external water tap 10, into clean water using a filter unit (or filter device) 20. The construction of the filter unit 20 may be variously changed. A plurality of single filters 21, 22, and 23 may constitute the filter unit 20. For example, the filter unit 20 may include a pre-carbon filter 21, an ultra-filtration (UF) filter 22, and a post-carbon filter 23.

When raw water is filtered by the filter unit 20 into clean water, the clean water may be discharged out of the drinking water supply device 1 through a clean water pipe 30, a clean water supply valve 32, and the cock 73. The drinking water supply device 1 may be configured to supply cold water or hot water according to the demand of the user.

Heated clean water, i.e. hot water, may be discharged out of the drinking water supply device 1 through a first branch clean water pipe 301, which diverges from point A of the clean water pipe 30, which is located at the rear end of the filter unit 20, a heating unit (or heater) 51, a hot water pipe 50, a hot water supply valve 52, and the cock 73. Cooled clean water, i.e. cold water, may be discharged out of the drinking water supply device 1 through a second branch clean water pipe 302, which diverges from a point that is further downstream than point A of the clean water pipe 30, a cooling unit (or cooler) 41, a cold water pipe 40, a cold water supply valve 42, and the cock 73.

For the convenience of description, an embodiment in which clean water, cold water, and hot water are discharged through a single cock 73 is shown in FIG. 2. Alternatively, cocks for discharging the clean water, the cold water, and the hot water may be provided separately. Additionally, the clean water and the cold water may be discharged through one cock, and the hot water may be discharged through another cock.

A cock valve (hereinafter, also referred to as a "first valve") 74 may be provided at the rear end (i.e. the downstream side) of the clean water supply valve 32, the cold water supply valve 42, and the hot water supply valve 52. The cock valve or first valve 74 may be connected to a distribution pipe 60. The distribution pipe 60 may be connected to the clean water pipe 30, the cold water pipe 40, and the hot water pipe 50.

A water discharge pipe 70, through which clean water, cold water, or hot water may be supplied, may be provided at the rear end of the cock valve 74. Consequently, clean water, cold water, or hot water may be supplied into the distribution pipe 60, and, when the cock 73 is opened by the single cock valve 74, the clean water, the cold water, or the hot water may be selectively supplied through the water discharge pipe 70.

Meanwhile, a mineral supply module 100 for supplying minerals to drinking water flowing in the water discharge pipe 70 may be connected to the water discharge pipe 70. The mineral supply module 100 may be connected to one side of the water discharge pipe 70 via a connection pipe 120, which is connected to the water discharge pipe 70. The connection pipe 120 may function as a mineral water generation unit, in which minerals are mixed with drinking water.

The water discharge pipe 70 may include a first channel 71 connected to the front end of the connection pipe 120 and a water discharge channel 72 connected to the rear end of the connection pipe 120. When the cock valve 74 is opened, clean water, cold water, or hot water may flow into the first channel 71 toward the cock 73, and may be introduced into the connection pipe 120 before the clean water, the cold water, or the hot water is discharged through the cock 73.

That is, the first channel 71 is disposed at the upstream side of the connection pipe 120 so as to supply drinking water, such as clean water, cold water, or hot water, to the connection pipe 120. The water discharge channel 72 is provided between the connection pipe 120 and the cock 73 so as to selectively discharge mineral water, generated in the connection pipe 120, through the cock 73.

The mineral supply module 100 may include a mineral container 140, a pump 160 for pressurizing the mineral container 140, a second channel 110 connected between the connection pipe 120 and the mineral container 140, and a mineral valve (hereinafter, also referred to as a "second valve") 130 provided in the second channel 110. The minerals supplied from the mineral supply module 100 to the connection pipe 120 may be a high concentration of condensed minerals.

In addition, the amount of minerals that are supplied from the mineral supply module 100 to the connection pipe 120 may be critical in determining the taste of the mineral water discharged through the cock 73. At this time, the amount of minerals that are supplied from the mineral supply module 100 to the connection pipe 120 may be much smaller than the flow rate of drinking water (i.e. clean water, cold water, or hot water) flowing in the connection pipe 120.

Consequently, the connection pipe 120 may be provided with a microchannel unit (or microchannel) 121. That is, condensed minerals may be supplied to the drinking water flowing in the connection pipe 120 through the microchannel unit 121. For example, the connection pipe 120 may be formed in a "T" shape. The connection pipe 120 may be provided with a mixing pipe 122 disposed between the first channel 71 and the water discharge channel 72 in the state of being parallel to the first channel 71 and the water discharge channel 72 and a microchannel unit 121 configured to supply condensed minerals to the mixing pipe 122 in the direction perpendicular to the mixing pipe 122.

Hereinafter, the concrete construction of the mineral supply module 100 and the structure in which minerals are supplied from the mineral supply module 100 to the water discharge pipe 70 will be described in detail with reference to FIG. 3. FIG. 3 is a view schematically showing the construction of a mineral supply module according to an embodiment of the present invention.

Hereinafter, reference numeral 74, which denotes the cock valve in the above description, will denote a first valve for the convenience of description. Referring to FIGS. 2 and 3 together, the drinking water supply device 1 according to the embodiment of the present invention may include a water discharge pipe 70, in which drinking water flows, a flow rate sensor 75 for sensing the flow rate of the drinking water, a connection pipe 120 defining a mineral supply line extending to one side of the water discharge pipe 70, a second channel 110 for supplying minerals to the connection pipe 120, a mineral container 140 for storing condensed minerals, and a pump 160 for pressurizing the mineral container 140.

The water discharge pipe 70 may be provided with a first channel 71 and a water discharge channel 72. The first channel 71 may be located further upstream than the water discharge channel 72. Specifically, the first channel 71 may be configured such that drinking water flows in the first channel 71, and the first channel 71 may be provided with a first valve 74 for selectively opening and closing the first channel 71.

The flow rate sensor 75 may be configured to sense the flow rate of the drinking water flowing in the water discharge pipe 70. More specifically, the flow rate sensor 75 may be configured to sense the flow rate of the drinking water flowing in the first channel 71 in real time.

The flow rate sensor 75 may be provided in the clean water pipe 30 at the rear end of the filter unit 20. Alternatively, the flow rate sensor 75 may be provided in the first channel 71. That is, the flow rate sensor 75 may be provided in a pipe or a channel located further upstream than the connection pipe 120 for sensing the flow rate of drinking water.

The water discharge channel 72 may be connected to the rear end of the first channel 71 for discharging drinking water. That is, drinking water may sequentially flow through the first channel 71 and the water discharge channel 72, and may then be discharged through the cock 73.

The connection pipe 120 may be connected between the first channel 71 and the water discharge channel 72. The connection pipe 120 may be formed in a "T" shape, and may be provided with a mixing pipe 122 for guiding the drinking water having passed through the first channel 71 to the water discharge channel 72 and a microchannel unit 121 defining a condensed mineral channel that extends to the mixing pipe 122 in the direction perpendicular to the mixing pipe 122.

When condensed minerals are guided to the mixing pipe 122, the pressure applied to the condensed minerals may be reduced while the condensed minerals pass through the microchannel unit 121. The cross-sectional diameter of the microchannel unit 121 may be less than the length of the microchannel unit 121. In addition, the cross-sectional area of the microchannel unit 121 may be less than the cross-sectional area of the mixing pipe 122. Consequently, it is possible to accurately control the amount of condensed minerals that are guided to the mixing pipe 122.

The second channel 110 may be configured to supply minerals (for example, condensed minerals) to the connection pipe 120. That is, the second channel 110 may be formed as a mineral supply pipe (or a mineral supply line).

One end of the second channel 110 in the longitudinal direction thereof may be connected to the connection pipe 120. More specifically, one end of the second channel 110 in the longitudinal direction thereof may be connected to the microchannel unit 121 of the connection pipe 120.

Consequently, the pressure at which condensed minerals are supplied through the second channel 110 may be reduced by the microchannel unit 121. That is, the microchannel unit 121 functions to reduce the pressure at which condensed minerals are supplied through the second channel 110. In addition, a second valve 130 may be provided in the second channel 110. The second valve 130 is configured to selectively open and close the second channel 110.

The mineral container 140 may be configured to store condensed minerals. In addition, the mineral container 140 may be connected to the connection pipe 120 via the second channel 110. That is, one end of the second channel 110 in the longitudinal direction thereof may be connected to the connection pipe 120, and the other end of the second channel 110 in the longitudinal direction thereof may be connected to the mineral container 140.

The pump 160 may pressurize the interior of the mineral container 140 in order to discharge the condensed minerals stored in the mineral container 140 from the mineral container 140. For example, the pump 160 may be an air pump. That is, the pump 160 may be an air pump that suctions external air and injects the suctioned air into the mineral container 140.

Consequently, the pump 160 may suction external air and inject the suctioned air into the mineral container 140 in order to increase the pressure in the mineral container 140. That is, when external air is injected into the mineral container 140 according to the operation of the pump 160, the condensed minerals stored in the mineral container 140 may be discharged out of the mineral container 140 due to the increase of the pressure in the mineral container 140.

At this time, the condensed minerals discharged out of the mineral container 140 may flow into the second channel 110. As a result, the pressure in the second channel 110 may be increased. In addition, the pressure in the mineral container 140 may be equal to the pressure in the second channel 110 since the interior of the mineral container 140 communicates with the second channel 110.

In addition, the mineral container 140 may be provided at the lower part thereof with an injection hole 141, through which external air is injected into the mineral container 140, and a discharge hole 142, through which the condensed minerals are discharged from the mineral container 140. Specifically, the condensed minerals stored in the mineral container 140 may be directed to the lower side of the mineral container 140 by gravity. The airtightness of the mineral container 140 may be improved since the injection hole 141 and the discharge hole 142 are formed at the lower part of the mineral container 140.

More specifically, the drinking water supply device 1 according to the embodiment of the present invention may further include a container fastening unit or fitting 150, which is fastened to the mineral container 140 at the lower side of the mineral container 140. The injection hole 141 and the discharge hole 142 may be formed at the lower end of the container fastening unit 150.

In addition, the container fastening unit 150 may be provided with an air injection channel 143, which communicates with the injection hole 141, and a mineral discharge channel 144, which communicates with the discharge hole 142. The injection hole 141 may communicate with the interior of the mineral container 140 through the air injection channel 143, and the discharge hole 142 may communicate with the interior of the mineral container 140 through the mineral discharge channel 144.

Since the pump 160, i.e. the air pump, is configured to inject air into the mineral container 140, it is necessary to maintain the airtightness of the mineral container 140 in order to discharge the required amount of condensed minerals from the mineral container 140. Since the mineral container 140 is disposed at the upper side of the container fastening unit 150, and the injection hole 141 and the discharge hole 142 are provided at the lower end of the container fastening unit 150, as described above, the airtightness of the mineral container 140 may be improved.

In addition, an air filter 161 may be provided at the air inlet side of the pump 160. The air filter 161 functions to filter impurities contained in the air injected into the mineral container 140 according to the operation of the pump 160. Here, the air filter 161 may be made of a hydrophobic member.

In addition, a check fitting or check valve 163 may be provided in a connection line 162 that connects between the pump 160 with the mineral container 140 (i.e. the container fastening unit 150). The check fitting or check valve 163 prevents minerals from flowing backward from the mineral container 140 to the pump 160. The reason for this is that the pump 160 may be damaged if minerals flow backward to the pump 160.

A mixing tank 300 for mixing minerals with drinking water is provided in the water discharge channel 72. The mixing tank 300 may be a container having a predetermined capacity therein.

The mixing tank 300 may be provided with a water inlet port 302, through which minerals and drinking water are introduced into the mixing tank 300, and a water output port 304, through which drinking water containing minerals, i.e. mineral water, is discharged from the mixing tank 300.

The water inlet port 302 is provided in the lower part of the mixing tank 300, and the water output port 304 is provided in the upper part of the mixing tank 300. That is, the water inlet port 302 is located lower than the water output port 304. Consequently, minerals and drinking water are introduced through the water inlet port 302, and then drinking water containing minerals, i.e. mineral water, is discharged through the water output port 304.

A water discharge valve 320 for opening and closing the water discharge channel 72 is provided at the rear end of the mixing tank 300, i.e. the rear end of the water discharge channel 72. The water discharge valve 320 opens and closes the channel along which the mineral water stored in the mixing tank 300 is supplied through the cock 73. When the water discharge valve 320 opens the water discharge channel 72, the mineral water is discharged through the cock 73. On the other hand, when the water discharge valve 320 closes the water discharge channel 72, the mineral water is not discharged through the cock 73.

Meanwhile, the drinking water supply device 1 according to the embodiment of the present invention may further include a controller 180 for controlling the first valve 74, the flow rate sensor 75, the second valve 130, the pump 160, and the water discharge valve 320. The controller 180 may be electrically connected to the first valve 74, the flow rate sensor 75, the second valve 130, the pump 160, and the water discharge valve 320.

In addition, the controller 180 may receive a water discharge signal for discharging mineral water desired by a user through the input unit 4. The controller 180 may control the first valve 74, the second valve 130, and the water discharge valve 320 such that mineral water is discharged in proportion to the time for which the user pushes the input unit 4.

Specifically, upon receiving a water discharge signal from the input unit 4, the controller 180 may open the first valve 74 and the second valve 130 first, and may then open the water discharge valve 320. In addition, the controller 180 may control the water discharge valve 320 to close the water discharge channel 72 until a first predetermined amount of drinking water is supplied to the mixing tank 300 as the result of opening the first valve 74.

When the first predetermined amount of drinking water is supplied to the mixing tank 300, the controller 180 may open the first valve 74 and the second valve 130 while keeping the water discharge valve 320 closed so as to supply minerals to the mixing tank 300. That is, both the first valve 74 and the second valve 130 may be controlled such that minerals are supplied to the mixing tank 300 together with drinking water.

When a second predetermined amount of drinking water is supplied to the mixing tank 300, the controller 180 may open the water discharge valve 320 so as to supply mineral water to a user. That is, since minerals are mixed with drinking water in the mixing tank 300 before the mineral water is supplied to the user, mineral water, in which the minerals are sufficiently mixed with drinking water, may be supplied to the user.

When the water discharge amount input by the user has not been reached in the state in which the second predetermined amount of drinking water is supplied to the mixing tank 300, the controller 180 keeps the water discharge valve 320 open. In addition, when the water discharge amount input by the user has not been reached in the state in which the second predetermined amount of drinking water is supplied to the mixing tank 300, the controller 180 keeps the first valve 74 open.

Consequently, the user may continuously receive the mineral water through the cock 73 from the time when the mineral water starts to be supplied to the user through the water discharge valve 320 since the water discharge valve 320 is kept open. The user may feel continuously receiving the mineral water.

Meanwhile, when the time when the second predetermined amount of drinking water is supplied to the mixing tank 300 again has been reached in the state in which the first valve 74 is open, the controller 180 may open the second valve 130 again to supply minerals to the mixing tank 300. The controller 180 may control the first valve 74 and the second valve 130 such that mineral water is continuously made in the mixing tank 300. The flow rate at which drinking water is supplied to the mixing tank 300 may be sensed by the flow rate sensor 75, and relevant information may be transmitted to the controller 180 such that the controller controls the first valve 74, the second valve 130, and the water discharge valve 320.

A process in which a user discharges mineral water will be described with reference to FIG. 4. The user manipulates the input unit 4 in order to input a water discharge signal for discharging mineral water through the cock 73 (S10). At this time, the user may change the time for which the input unit 4, which is formed in the shape of a lever, is pushed such that mineral water is discharged in proportion to the time for which the input unit 4 is pushed.

The controller 180 opens the first valve 74 such that drinking water is supplied to the mixing tank 300 (S20). The drinking water, which passes through the first valve 74, passes through the flow rate sensor 75, by which the amount of drinking water that is supplied to the mixing tank 300 may be sensed.

When the flow rate of drinking water sensed by the flow rate sensor 75 has reached a first predetermined amount (S30), the controller 180 may open the second valve 130 such that minerals contained in the mineral container 140 are supplied to the mixing tank 300 (S40). At this time, the controller 180 may drive the pump 160 such that the pressure in the mineral container 140 is increased and such that minerals contained in the mineral container 140 are supplied to the mixing tank 300 through the channel by the increased pressure.

The first predetermined amount may be the amount of drinking water that is mixed with the amount of minerals supplied through the second valve 130 in order to make desired mineral water. For example, the first predetermined amount may be 100 ml.

Until step S40 is performed, the controller 180 closes the water discharge valve 320 such that the mineral water stored in the mixing tank 399 is not supplied to the user through the cock 73. That is, the minerals are mixed with the drinking water in the mixing tank 300, and then the mixture, i.e. mineral water, is supplied to the user.

When the amount of drinking water supplied to the mixing tank 300 has reached a second predetermined amount (S50), the controller 180 may open the water discharge valve 320 such that the mineral water stored in the mixing tank 399 is supplied to the user through the cock 73 (S60). The first predetermined amount and the second predetermined amount may be the same such that the water discharge valve 320 is opened to supply the mineral water to the user while the minerals are supplied to the mixing tank 300.

Alternatively, the second predetermined amount may be greater than the first predetermined amount such that the minerals are mixed with the drinking water in the mixing tank 300 for a predetermined time and then the mineral water is supplied to the user. The first predetermined amount and the second predetermined amount may be sensed by the flow rate sensor 75, and relevant information may be transmitted to the controller 180.

When the amount of mineral water that the user wishes to discharge, which has been input through the input unit 4, is greater than the second predetermined amount (S70), the controller 180 may open the first valve 74 in the state in which the water discharge valve 320 is open such that drinking water is supplied to the mixing tank 300 (S80). At step S80, a process in which the water discharge valve 320 is open such that the mineral water is discharged through the cock 73 is also performed.

When the flow rate of drinking water measured by the flow rate sensor 75 has reached the first predetermined amount again, step S40 is performed again. As a result, the second valve 130 is opened such that minerals are supplied to the mixing tank 300. After step S80, the water discharge valve 320 is open, and mineral water is supplied to the user through the cock 73.

At step S70, the second predetermined amount may be equal to the capacity of the mixing tank 300. If the user wishes to discharge the amount of mineral water that is greater than the capacity of the mixing tank 300, the amount of the mineral water temporarily stored in the mixing tank 300 is not sufficient. For this reason, minerals and drinking water are continuously supplied to the mixing tank 300 in the state in which the water discharge valve 320 is open so as to make additional mineral water.

Even in the state in which the water discharge valve 320 is open, the minerals may be mixed with the drinking water, and then the mineral water may be discharged from the mixing tank 300 through the water outlet port 304 of the mixing tank 300, since the water inlet port 302 of the mixing tank 300 is located lower than the water outlet port 304.

When the amount of mineral water input by the user has been discharged, a step of closing the first valve 74, the second valve 130, and the water discharge valve 320 may be performed. The reason for this is that it is not necessary to further supply drinking water or minerals to the mixing tank 300 and to further supply mineral water to the user through the water discharge valve 320 after the amount of mineral water desired by the user has been discharged.

Mode for Invention

Various embodiments have been described in the best mode for carrying out the invention.

Industrial Applicability

The present invention has the effect of providing a drinking water supply device that is capable of stably mixing mineral with drinking water to provide water having a uniform taste and a method of controlling the same. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A drinking water supply device comprising:
   a first channel through which drinking water flows, the first channel including a first valve that opens and closes the first channel and a flow rate sensor that senses a flow rate of the drinking water through the first channel;
   a water discharge channel connected to the first channel and configured to discharge the drinking water which is supplied from the first channel;
   a connection pipe that connects the first channel to the water discharge channel;
   a second channel through which minerals are supplied to the connection pipe, the second channel including a second valve that opens and closes the second channel;
   a mineral container connected to the second channel and provided upstream of the second valve to hold the minerals which are to be supplied to the second channel;
   a tank connected to the water discharge channel and configured to store the drinking water and the minerals which are supplied through the water discharge channel to form mineral water;
   a water discharge valve provided downstream of the tank to allow discharge of the mineral water through the tank and close the water discharge channel;
   an input lever to allow dispensing of the mineral water; and a controller configured to open the first valve and the second valve first and then open the water discharge valve upon receiving an input signal from the input lever, wherein the controller is configured to close the water discharge valve and open the first valve to supply a first predetermined amount of the drinking water to the tank, and wherein when the first predetermined amount of the drinking water is supplied to the tank, the controller opens the second valve while keeping the water discharge valve closed and the first valve open so as to supply minerals to the tank along with the drinking water.

2. The drinking water supply device according to claim 1, wherein when a second predetermined amount of drinking water greater than the first predetermined amount is supplied to the tank, the controller opens the water discharge valve to supply the mineral water to a user.

3. The drinking water supply device according to claim 2, wherein the tank includes a water inlet port and a water outlet port, the water inlet port being located lower than the water outlet port.

4. The drinking water supply device according to claim 3, wherein when a water discharge amount input by the user has not been reached after the second predetermined amount of drinking water is supplied to the tank, the controller keeps the water discharge valve open.

5. The drinking water supply device according to claim 4, wherein the second predetermined amount is equal to a capacity of the tank.

6. The drinking water supply device according to claim 3, wherein, when a water discharge amount input by the user has not been reached after the second predetermined amount of drinking water is supplied to the tank, the controller keeps the first valve open.

7. The drinking water supply device according to claim 6, wherein, when the second predetermined amount of drinking water has been supplied to the tank a second time while the first valve is open, the controller opens the second valve a second time to supply minerals to the tank.

8. A method of controlling a drinking water supply device comprising:
   inputting a water discharge signal through an input lever;
   opening a first valve when a discharge channel is closed by a water discharge valve to supply drinking water to a tank when the water discharge signal is input;
   opening a second valve to supply minerals to the tank when an amount of drinking water supplied to the tank reaches a first predetermined amount while the first valve is open and the water discharge valve is closed; and
   opening the water discharge valve to discharge mineral water from the tank to an outside through a spout when the amount of drinking water supplied to the tank reaches a second predetermined amount greater than the first predetermined amount.

9. The method according to claim 8, further including keeping the first valve open while the water discharge valve is open when a user inputs a signal through the input lever to discharge a greater amount of mineral water than the second predetermined amount.

10. The method according to claim 9, further including opening the second valve after the first predetermined amount of drinking water is supplied to the tank while the water discharge valve and the first valve are open when the user inputs a signal through the input lever to discharge a greater amount of mineral water than the second predetermined amount.

11. The method according to claim 9, wherein the second predetermined amount is equal to a capacity of the tank.

12. The method according to claim 9, wherein the tank includes a water inlet port that allows the minerals and the drinking water to be introduced into the tank from the discharge channel, and a water outlet port that allows the mineral water to be discharged from the tank to the spout, the water outlet port being located higher than the water inlet port.

13. The method according to claim 8, further including closing the first valve, the second valve, and the water discharge valve when an amount of mineral water requested by a user through the input lever is discharged.

* * * * *